United States Patent Office 3,489,579
Patented Jan. 13, 1970

3,489,579
ABLATIVE HEAT SHIELDING AND INJECTION COOLING BY ADDITION OF SURFACE ACTIVE AGENTS
Bernard Steverding, Guntersville, Ala., assignor to the United States of America as represented by the Secretary of the Army
No Drawing. Filed May 25, 1966, Ser. No. 553,265
Int. Cl. C03c 25/00, 3/30
U.S. Cl. 106—52                  1 Claim

ABSTRACT OF THE DISCLOSURE

The incorporation of surface-active agents (e.g., inorganic oxide selected from boric oxide, phosphorous pentoxide, arsensic oxide, selenium oxide, and tellurium oxide) in ablative materials surrounding a body to improve efficiency of cooling by increasing vapor pressure while maintaining the same rate of flowoff. Also, this invention relates to incorporation of surface-active agents (e.g., higher alcohols and derivatives thereof), selected from primary alcohols and derivatives thereof having 12 to 18 carbon atoms in the primary carbon chain, in aqueous coolant to improve the efficiency of cooling in injection cooling by increasing the vapor pressure while maintaining the same flow rate.

---

Ablative heat shielding is one of the most effective measures for providing thermal protection to bodies exposed to extremely high temperatures and high heat fluxes such as are encountered in atmospheric re-entry of ballistic missile nose cones and space vehicles. In heat shielding by ablation, the body is surrounded by a layer of material which undergoes thermal decomposition, melting or evaporation at the exposed surface. In effect, the flow of heat into the body is counteracted by the flow of material outward. For maximum effectiveness, the ablative material should have a low thermal conductivity, a high thermal capacity in the solid, liquid and gaseous states, a high heat of fusion and evaporation and a high heat of dissociation of its vapors.

Various types of materials, which may be classified as glassy, subliming or intumescent, have been used for ablative cooling, and normally more than one of these types have been employed in combination with one another as a composite ablator. The most widely used composite has comprised a plastic such as a phenolic or epoxy resin having cloth or chopped fibers made from a glassy material such as fused silica incorporated therein. The glassy material serves both to strengthen the composite and to enhance its cooling performance. The plastic component, when subjected to a high temperature, pyrolyzes into a carbonaceous residue and a variety of gaseous compounds. The generation of these gases and injection of the gases into a gas boundary layer contribute a strong cooling effect. Further cooling results from cracking of the gases into smaller molecules by an endothermic reaction, the resulting molecules having a higher heat capacity. The glassy material in the composite forms a layer of liquid glass on the charred surface, which layer flows under the action of aerodynamic shear. When a surface indentation occurs by spalling of the char, liquid glass flows into the hole and smooths the surface again.

The effectiveness of an ablative material is decisively influenced by the ratio of the evaporated mass to the total mass loss during ablation. The maximum value for this ratio, unity, is obtained for subliming ablators; however, glassy materials liquify before they evaporate, and part of the liquid mass is lost by flowoff. The viscosity of the liquid glass layer should be large to prevent excessive flowoff. Improved ablation performance would be obtained if the vapor pressure, and thus the extent of sublimation, of the glass could be increased. Another important factor contributing to a minimized loss of liquid material during ablation is good wettability between the liquid layer and the substrate, the formation and loss of droplets being suppressed by this means.

Another method of heat shielding influenced by the ratio of evaporated mass to total mass loss is injection or film cooling. In this method, a liquid such as water is injected at the wall of the body in such a manner as to form a protective layer of liquid or vapor adjacent the surface of the wall. This method would also be enhanced by increasing the vapor pressure of the injected liquid coolant without significantly affecting the viscosity, heat conductivity and heat of vaporization.

It is, therefore, an object of this invention to provide a method of improving the cooling effectiveness of ablative heat shielding materials.

Another object is to provide a method of improving the cooling effectiveness of injected liquid coolants.

Another object is to provide a method of increasing the vapor pressure of glassy materials without decreasing their viscosity.

Another object is to provide a method of increasing the wettability of said glassy materials and liquid coolants.

Another object is to provide a method of improving the ablative cooling effectiveness of fused silica.

Other objects and advantages will be apparent from the following description.

In the present invention, a small amount of a surface active agent is provided in ablative materials and in liquid injection or film coolants. Cooling effectiveness is substantially improved without significantly affecting bulk properties of the ablative material or liquid coolant.

Although this invention is not to be understood as limited to a particular theory, it is postulated that the improved ablation performance results from increasing the rate of evaporation of the liquid glass by increasing the vapor pressure of the liquid without affecting any other properties. Surface activity and the increase in vapor pressure in systems of this type are caused by the same phenomenon, that is, heterophobic behavior between solute and solvent. Surface active agents will generally increase the total vapor pressure, hence, the rate of evaporation. Since ablation efficiency is very sensitive function of the ratio of the mass of evaporated material to the mass of material flowing under the action of aerodynamic shear, efficiency is enhanced by increasing the rate of evaporation while maintaining the same rate of flowoff. The same factors enter into the improvement of the performance of liquid injection or film coolants. Increased wettability between liquid and substrate also contributes significantly to the improved performance.

An inorganic oxide is employed as the surface active agent for glassy materials. Boric oxide, $B_2O_3$; phosphorus pentoxide, $P_2O_5$; arsenic oxide, $As_2O_3$; selenium oxide, $SeO_2$; or tellurium oxide, $TeO_2$ can be used, and boric oxide is preferred. These oxides function as surface active agents in liquid glass.

The inorganic oxide is provided in the glassy material at a proportion of about 1 to 5 weight percent. In order to be effective, the surface active agent should be present at a relatively high concentration at the surface. Since these agents normally collect at the surface, a relatively small total concentration is sufficient. It would appear that where ablation velocities are high and the surface layer is removed at a rapid rate, the concentration of surface active agent in the layer would be rapidly deleted and would not be replenished because diffusion of the surface active agent in the liquid is slow owing to the high viscosity. However, the passage of gas bubbles through the film caused by the production of gases in the decomposition of the substrate provides another mechanism for transport of the agent to the surface.

The term "glassy material" is intended to include any of the glasses or glass-like compositions which are employed as ablative materials. In particular, the glasses used for this purpose normally comprise a major portion of silica, and minor proportions of other glass-forming oxides such as aluminum oxide, alkaline earth oxides and alkali metal oxides. In a preferred embodiment, the inorganic surface active agent is employed in fused silica, which is the most effective of the previously used glassy materials.

For liquid injection or film coolants, a substance which functions as a surface active agent in the particular liquid is employed. For aqueous coolants, higher alcohols, for example, primary normal alcohols having 12 to 18 carbon atoms in the primary carbon chain and derivatives thereof, can be used. About 1 to 5 weight percent surface active agent is provided in the liquid coolant.

The surface active agent does not significantly affect bulk properties other than vapor pressure so that the glassy ablative material or liquid coolant may be handled and used in substantially the same manner as has been employed previously for materials containing no surface active agent. The surface active agent is mixed or dispersed in the liquid coolant, and for glassy material, it is added prior to or during the liquid melt stage in preparation of the glassy material.

In addition to the materials described above, other types of ablative materials which melt and flow under the influence of high heat flux are also benefited by incorporation of a suitable surface active agent. Non-pyrolytic polymers such as nylon and Teflon which melt and flow before charring or material such as asbestos which becomes glassy as it melts are improved by the means.

The effect of added boric oxide on the ablative cooling performance of fused silica has been shown in actual tests. A composite ablative heat shield containing fibers of fused silica having 4 weight percent boric oxide incorporated therein was exposed to a high heat flux. After exposure, the remaining fused silica was found to contain a smaller amount of boric oxide, the boric oxide being preferentially removed during ablation. The heat shield withstood exposure and remained intact to a substantially greater extent than similar heat shields containing fibers of fused silica without boric oxide.

It is to be understood that various modifications may be employed within the scope of the invention.

What is claimed is:

1. The method of improving the cooling effectiveness of fused silica surrounding a body which comprises incorporating in said fused silica a surface-active agent in the amount of about 1 to 5 weight percent, said surface-active agent being an inorganic oxide selected from phosphorous pentoxide, arsenic oxide, selenium oxide, and tellurium oxide to cause an increase in the vapor pressure of said fused silica when said fused silica is exposed to high heat fluxes capable of causing said fused silica to undergo one or more changes of thermal decomposition, melting, and evaporation at the exposed surface of said fused silica to thereby provide a flow of material outward from said body when said body and the fused silica surrounding said body are subjected to the action of aerodynamic shear, and said flow of material is maintained while said vapor pressure is increased.

References Cited

UNITED STATES PATENTS

| | | | |
|---|---|---|---|
| 2,229,711 | 1/1941 | Walker et al. | 252—67 |
| 3,054,221 | 9/1962 | Elmer | 106—52 |
| 3,103,885 | 9/1963 | McLauchlan | 102—105 |
| 3,191,392 | 6/1965 | Donnelly | 252—67 |
| 3,189,471 | 6/1965 | Thomas | 106—50 |

OTHER REFERENCES

Chem. Abstracts, 46 (1952), Item7261c, "Use of Surface-Active Agents in Cooling-Tower Water Treatment."

Butz, "Growth Potential Defined for Heat Sink, Abalation Shields," Sept. 7, 1959 (reprint from Aviation Week), p. 5 relied upon.

Steverdine, J. Am. Inst. Aeron. Astron. 2, pp. 549–551 (March 1964).

HELEN N. McCARTHY, Primary Examiner

U.S. Cl. X.R.

102—105; 106—50, 54